(12) United States Patent
Sellati (10) Patent No.: US 7,735,261 B2
(45) Date of Patent: Jun. 15, 2010

(54) SELF-LOCKING DOOR ASSEMBLY

(75) Inventor: Patrick A. Sellati, Lighthouse Point, FL (US)

(73) Assignee: Strike Industries, Inc., Pompano Beach, FL (US)

( * ) Notice: Subject to any disclaimer, the term of this patent is extended or adjusted under 35 U.S.C. 154(b) by 0 days.

(21) Appl. No.: 12/209,541

(22) Filed: Sep. 12, 2008

(65) Prior Publication Data

US 2009/0083942 A1 Apr. 2, 2009

Related U.S. Application Data

(60) Provisional application No. 60/975,716, filed on Sep. 27, 2007.

(51) Int. Cl.
*E05D 15/40* (2006.01)

(52) U.S. Cl. .................. 49/247; 49/246; 292/DIG. 11; 292/DIG. 17

(58) Field of Classification Search .................. 49/463, 49/246, 247; 292/DIG. 11, DIG. 17
See application file for complete search history.

(56) References Cited

U.S. PATENT DOCUMENTS

| | | | | |
|---|---|---|---|---|
| 11,227 A | * | 7/1854 | Ingalls | 49/463 |
| 1,155,161 A | * | 9/1915 | Ramsey | 49/246 |
| 1,905,082 A | * | 4/1933 | Wuebling | 49/246 |
| 2,991,117 A | * | 7/1961 | Tatter | 49/246 |
| 3,955,848 A | * | 5/1976 | Lutz et al. | 296/218 |
| 4,067,605 A | * | 1/1978 | Green et al. | 296/218 |
| 4,257,632 A | * | 3/1981 | DeStepheno | 292/263 |
| 4,289,349 A | * | 9/1981 | Symeonidis | 296/213 |
| 4,337,975 A | * | 7/1982 | Tamamushi et al. | 296/215 |
| 4,372,603 A | * | 2/1983 | Stanczak et al. | 296/146.12 |
| 4,479,622 A | * | 10/1984 | Howse | 244/129.5 |
| 4,484,773 A | * | 11/1984 | Lehne | 292/263 |
| 4,917,446 A | * | 4/1990 | Mariani | 312/325 |
| 5,067,278 A | * | 11/1991 | Lyons | 49/463 |
| 5,950,368 A | * | 9/1999 | Bradford | 52/20 |
| 6,374,651 B1 | | 4/2002 | Thielmann et al. | |
| 6,382,750 B1 | | 5/2002 | King | |
| 6,578,884 B2 | | 6/2003 | Chiang | |
| 6,658,803 B2 | * | 12/2003 | Szyjkowski | 52/213 |
| 6,746,092 B2 | | 6/2004 | Leccia et al. | |
| 6,971,687 B2 | | 12/2005 | Amy | |
| 6,976,714 B2 | | 12/2005 | Dionysian et al. | |
| 7,118,185 B2 | | 10/2006 | Mittag et al. | |
| 7,152,936 B2 | | 12/2006 | Tarasewicz | |
| 7,168,745 B2 | | 1/2007 | Jamnia et al. | |
| 7,175,243 B2 | | 2/2007 | Mittag et al. | |
| 7,219,391 B1 | | 5/2007 | Luca | |

* cited by examiner

*Primary Examiner*—Jerry Redman
(74) *Attorney, Agent, or Firm*—GrayRobinson, P.A.

(57) ABSTRACT

A preferred embodiment of a self-locking door assembly includes a door whose hinged-side connects to one side of a door frame by at least one hinge having two pivot joints. One of the pivot joints is mounted to the door frame and the other is mounted to the inside of the door. The free end of the door carries a latch member which engages an underside of the opposite side of the door frame when the door is partially or fully closed. After the latch engages the frame, forcing the hinged side of the door closed causes the hinge to toggle, holding the door closed under force and takes up play in the pivot joints and/or latch. For security, the pivot joints and latch are concealed when the door assembly is closed.

3 Claims, 6 Drawing Sheets

SELF-LOCKING DOOR ASSEMBLY

CROSS-REFERENCE TO RELATED APPLICATIONS

This application claims the benefit of U.S. Provisional Application Ser. No. 60/975,716 filed Sep. 27, 2007 under 35 U.S.C. §119(e) for all commonly disclosed subject matter. U.S. Provisional Application Ser. No. 60/975,716 is expressly incorporated herein by reference in its entirety to form part of the present disclosure.

STATEMENT REGARDING FEDERALLY SPONSORED-RESEARCH OR DEVELOPMENT

Not Applicable.

INCORPORATION BY REFERENCE

Not Applicable.

FIELD OF THE INVENTION

The invention relates to a door assembly. More particularly, the invention relates to a door assembly which holds itself closed under force when in a closed position and provides increased lateral clearance between the door and a door opening when the door is in an open position.

BACKGROUND OF THE INVENTION

U.S. Pat. Nos. 7,152,936; 7,219,391; 7,175,243; 7,168,745; 7,118,185; 6,976,714; 6,971,687; 6,746,092; 6,578,884; 6,382,750; 6,374,651 each show door assemblies of various types known in the prior art.

SUMMARY OF THE INVENTION

A door assembly according to the invention holds itself closed under force when in a closed position and provides increased lateral clearance between the door and a door opening in an open position. The door assembly of the invention can also be configured to provide resistance to tampering by positioning all hinge components and all latch components at locations which are hidden from view and inaccessible from the exterior of the door assembly when the door is in a closed position. In the closed position, the hinges and latches of the assembly are also loaded under lateral force. Such loading takes up any play in the hinges and latches. This assures a tight fit between the door and the door frame and prevents rattling or shaking of the door assembly when it is in the closed position without the necessity of manufacturing the hinges or latches to small dimensional tolerances.

A preferred embodiment includes a door which is selectively movable between an open position and a closed position with respect to a door frame. The door has a free side and a mutually opposed hinge side. The hinge side of the door is mechanically coupled to one side of a door frame by way of at least one hinge. Each hinge includes a pair of pivot joints which are mechanically coupled to one another by way of a hinge body which separates each pivot joint from the other. Each pivot joint pivots about an axis which is oriented parallel to the pivot axis of the other joint, but is separated a distance from the pivot axis of the other pivot joint by way of the hinge body. The hinges are preferably mounted so that all of their components, including any fasteners used to mount the hinges, are located inside the door assembly when the door is closed. Such mounting makes the hinges inaccessible, and hidden from view, from the exterior of the door assembly thereby helping to make the door assembly resistant to tampering.

When the door is moved from the open position to a certain partially closed position, a latch member affixed to the free end of the door engages a latch associated with the opposite side of the door frame. The latch is configured to allow the door to pivot about a third pivot axis. At this partially closed position, the hinge body extending between the first pivot axis and a second pivot axis of the hinge, and the portion of the door extending between the second pivot axis and the third pivot axis, form a toggle linkage in which the second pivot axis travels past a center position when the door is moved toward the closed position from the partially closed position upon closing or, vice versa upon opening.

In order to move the door from the partially closed position to the closed position, the hinge side of the door is forced closed so as to cause the second pivot joint to move past the center position toward the closed position. After the second pivot joint moves past the center position toward the closed position, the toggle linkage takes over, causing the door assembly to lock itself in the closed position. In the closed position, the hinge side of the door is closed firmly against the hinge side of the door frame and the latch securely engages the opposite side of the door. The toggle linkage biases the door to hold the door in the closed position under continuous force having a substantial component in a direction causing the door to bear down securely against the door frame. At least one of the latches preferably includes a tab engageable with the underside of the door frame. All components of the latches, including any fasteners used to mount them, are preferably located completely interiorly of the door assembly when the door is closed. By engaging the underside of the door frame, the tabs resist prying or pulling the free end of the door away from the door frame when the door is in the closed position. The tab is inaccessible, and hidden from view, from the exterior of the door assembly thereby helping to make the door assembly resistant to tampering. The hinges are preferably mounted so as to also be inaccessible and hidden from view from the outside of the door assembly when it is in the closed position.

The foregoing and other advantages and features of various embodiments of the invention will become apparent to a person of ordinary skill in the art upon review of the following detailed description the drawings, in which like reference numerals are used to refer to like items.

DETAILED DESCRIPTION OF A PREFERRED EMBODIMENT

Figure 1:
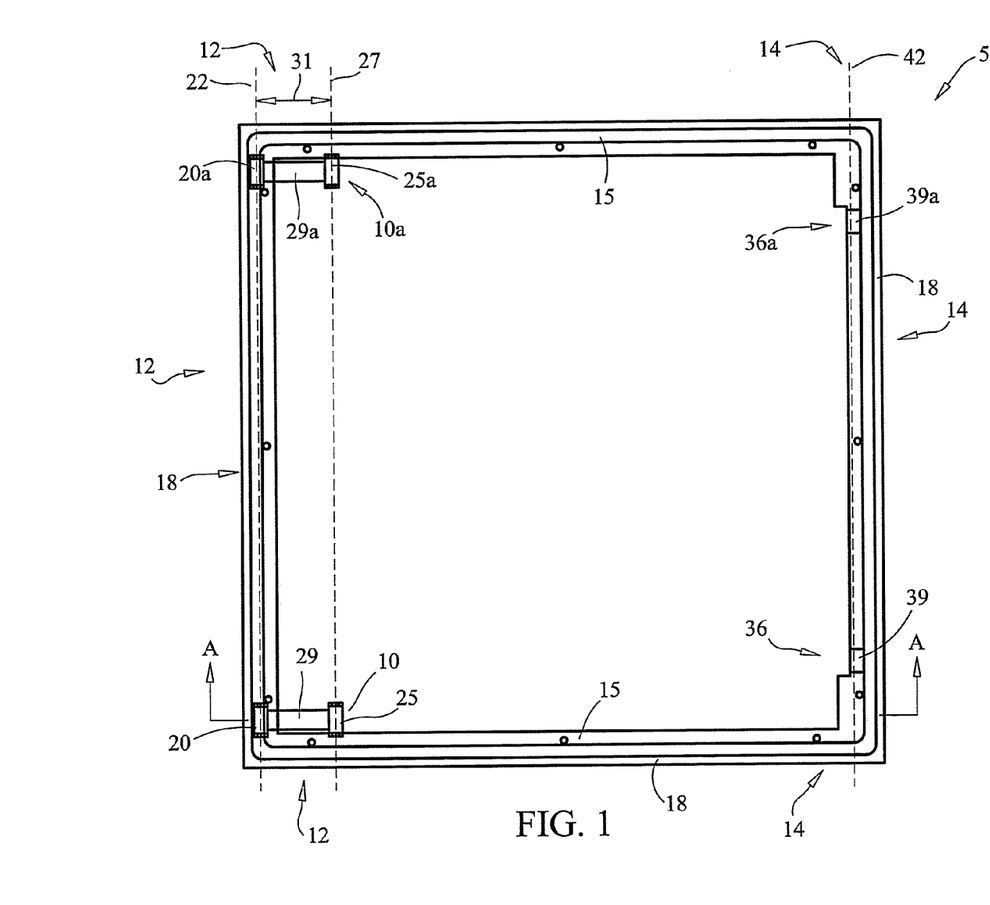
FIG. 1 is a transparent, front plan view illustrating a preferred embodiment of a door assembly according to the invention, the door assembly being shown in the closed position.

Referring initially to FIG. 1, a preferred embodiment of a door assembly 5 according to the invention is shown as used in the environment of a cabinet box 8. In FIG. 1, door assembly 5 is shown in a closed position. The door assembly 5 is selectively movable between an open position, a closed position, and various intermediate positions between the open position and the closed position.

Figure 6:
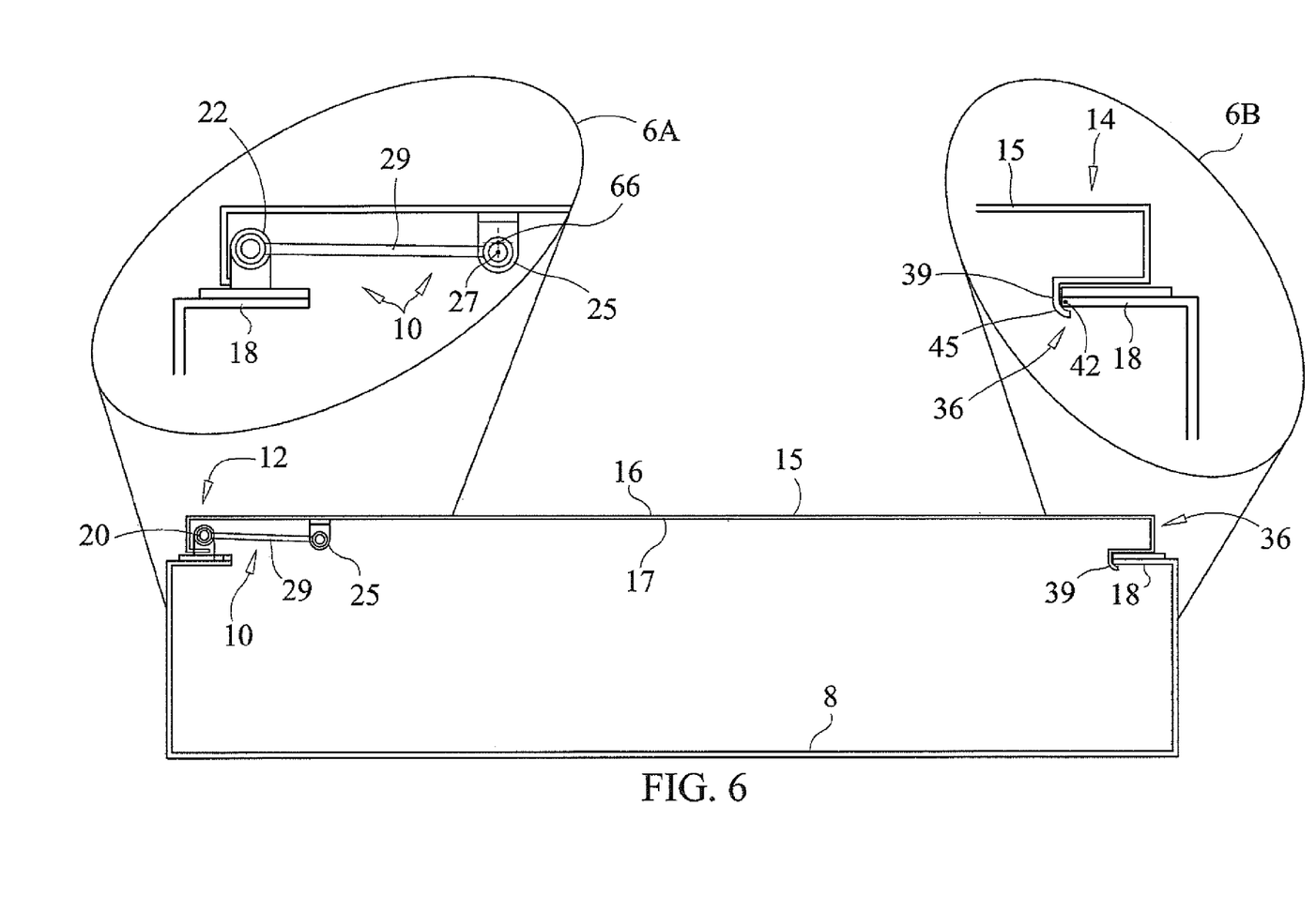
FIG. 6 is a bottom elevational, section view taken a long line A-A of FIG. 1 except showing the door assembly in a closed position.

Door assembly 5 includes a door 15 having a hinge side 12 and a generally opposite side 14. Door 15 is mounted to a hinge side 12 of a door frame 18 by way of a pair of identical hinges 10 and 10a. One of the ends of each hinge 10, 10a is mechanically coupled to the underside of door 15 at an inside surface 17 of door 15 as shown in FIG. 6. As FIG. 6 also shows, door 15 has an outside surface 16 located opposite its inside surface 17. In order to resist tampering, hinges 10, 10a are preferably mounted by welding, suitably strong adhesives, and/or fasteners which are inaccessible from the exterior of door assembly 5 when it is in the closed position.

Each hinge 10, 10a includes a respective first pivots joint 20, 20a, which enables the hinge to pivot about a first pivot axis 22. First pivot joint 20, 20a are each mechanically coupled to a hinge side 12 of the door frame 18. Each hinge 10, 10a also includes a respective second pivot joint 25, 25a, which enables the hinge to pivot about a second pivot axis 27. Second pivot joints 25, 25a are each mechanically coupled to an underside of door 15. First pivot joint 20 and second pivot joint 25 are also each mechanically coupled to one another by way of a hinge body 29 which serves to separate first pivot axis 22 from second pivot axis 27 by a substantially fixed distance 31. First pivot joint 20a and second pivot joint 25a are similarly mechanically coupled of a hinge body 29a.

Spacing distance 31 is preferably selected so as to be capable of providing both the toggle function, and to provide a desired amount of lateral clearance between the inside of door 15 the hinge side 12 of door frame 18 when door 15 is in an open position, as will be apparent from the drawings and described in further detail below.

Door assembly 5 further includes at least one latch 36, 36(a). In the preferred embodiment, latches 36, 36(a) are structurally and operationally identical. Accordingly, for the sake of simplicity, only latch 36 will be described in detail here. Latch 36 includes a pair of latchably mating members, one of which is mechanically coupled at all times to door 15, another of which is mechanically coupled at all times to door frame 18. Latch 36 is configured such that, when door assembly 5 transitions between either the closed position and the partially closed position, or vice versa, door 15 pivots with respect to door frame 18 about a third pivot axis 42. In the embodiment illustrated in FIG. 1, one of the mating members of latch 36 takes the form of a tab 39 which is attached to, or can be formed integrally with, an underside portion of door 15. Tab 39 projects first downwardly, then outwardly, from the underside portion of door 15. In the embodiment illustrated in FIG. 1, the other mating member of latch 36 comprises a fixed portion of door frame 18 itself. Preferably, a portion of tab 39 which engages the door frame 18 includes a curved portion 45 which facilitates smooth rotation of door 15 about third pivot axis 42. First pivot axis 22, second pivot axis 27 and third pivot axis 42 are each oriented parallel to one another, although they do not necessarily all lie in a common plane during any phase of operation of door assembly 5.

It is appropriate to note here that while the term "door frame" may be referred to in the singular, that term is not to be construed to encompass only a unitary or one-piece structure. As used herein, and in the claims, the term "door frame" is to be broadly construed and is intended to refer to any structure, or combination of structures, to which, on one hand, an end of hinges 10 and/or 10a is/are, directly or indirectly, mechanically coupled to, or generally adjacent, a hinge side 12 of door assembly 5, and to which, on the other hand, at least one engaging member of latches 36 and/or 36a is/are directly or indirectly, mechanically coupled to, or generally adjacent, a generally opposite side 14 of door assembly 5.

Figure 2:
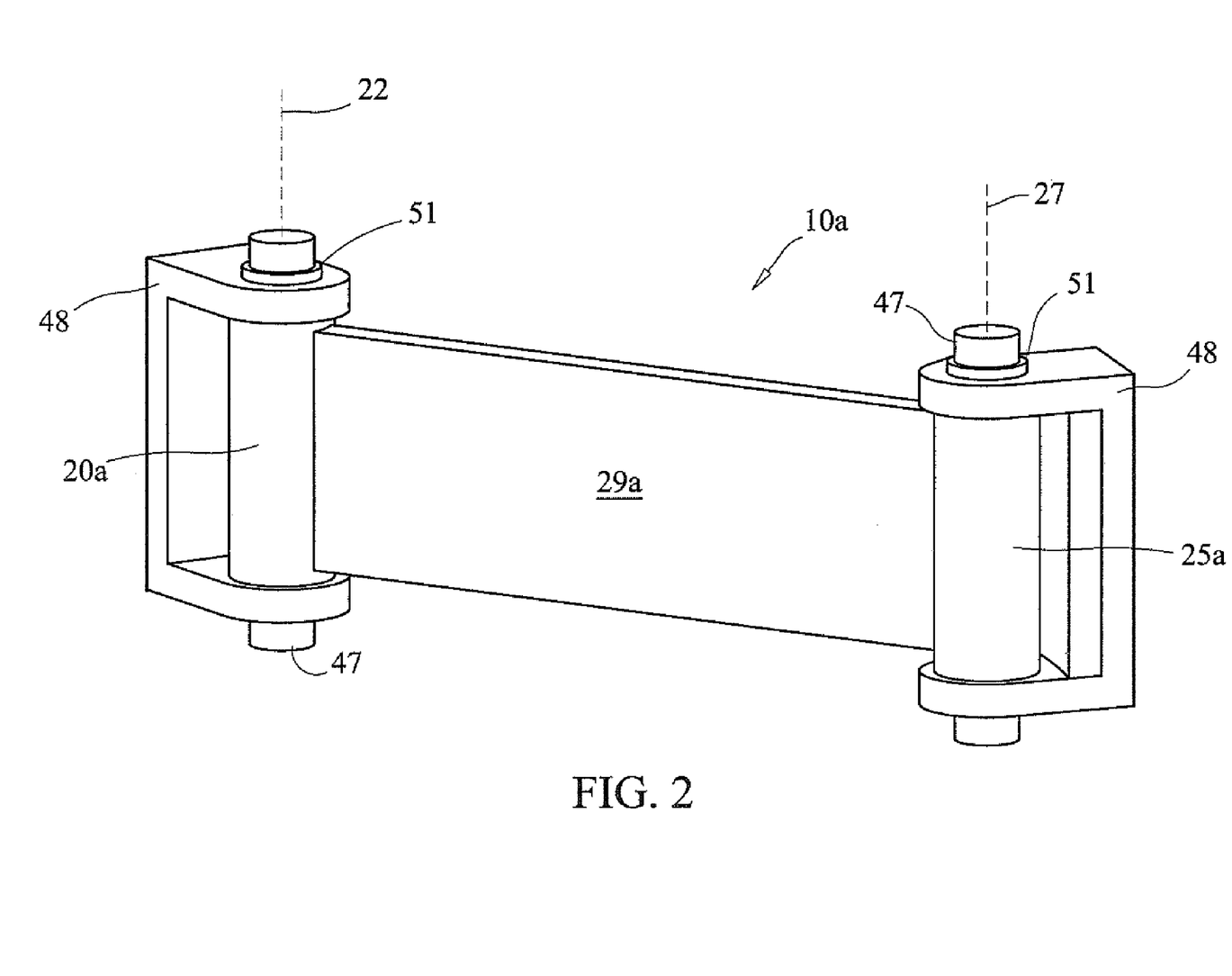
FIG. 2 is a perspective view showing an example of a suitable hinge for use in the invention.

FIG. 2 illustrates an example of a suitable hinge 10a in further detail. First pivot joint 20a and second pivot joint 25a are connected to one another by way of hinge body 29. First pivot joint 20a and second pivot joint 25a each comprise a respective hinge mount 48 within which a hinge pin 47 is rotatably journaled. Hinge pins 47 are retained to hinge mounts 48 by means of snap rings 51. Hinge 10 is structurally and operationally identical to hinge 10a.

Figure 3:
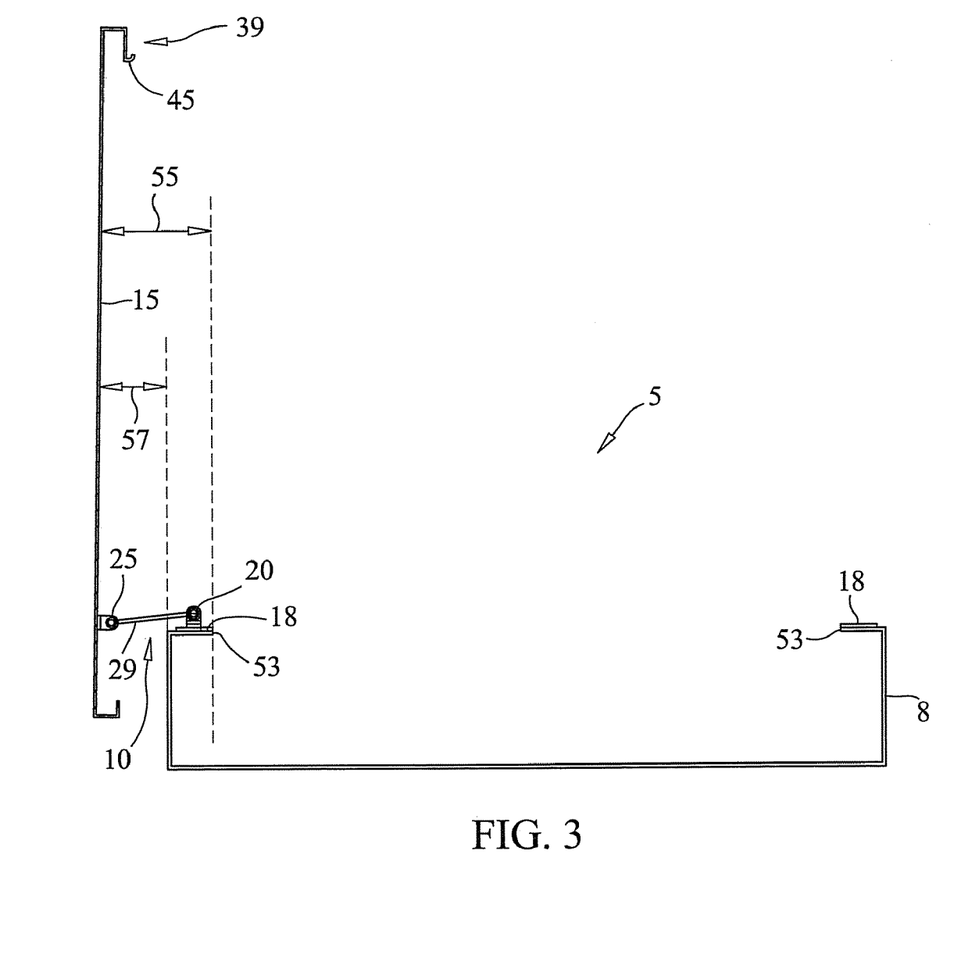
FIG. 3 is a bottom elevational, section view taken a long line A-A of FIG. 1 except showing the door assembly in the open position.

FIG. 3 shows door assembly 5 in the open position and illustrates an advantage capable of being provided by the invention. Cabinet 8 includes a door opening 53 spanned by door frame 18. As indicated by arrow 55, when the door assembly 5 is in the open position, the spacing distance 31 between respective pivot axes 22, 27 of pivot joints 20 and 25 provides substantial lateral clearance between door 15 and the edge of door opening 53. In applications in which the door assembly 5 is used on a cabinet, such as cabinet 8, or a similar structure having an outside edge, the invention also affords increased lateral clearance between that outside edge and door 15 as indicated by arrow 57.

Such additional clearance will provide an important advantage in many applications. For example, where the door assembly 5 is used in electrical equipment cabinets, such as circuit breaker panels, or any other type of enclosure used to house electrical or electronic equipment, the increased clearance will provide easier access to be interior of the enclosure and any equipment located therein. By so doing, persons installing or servicing such equipment being less likely to be subjected to electrical shock or other hazards which might be associated with working in tight quarters. Damage to equipment being installed in, or removed from, the enclosure would also be less likely to be damaged, due to accidental impact with door 15. The improved ease of access would also help to speed installation and service time as well as reduce fatigue of persons involved in such work.

It is to be appreciated that while the position in FIG. 3 is referred to as "the" open position, other open positions are possible. For example, unless a mechanical stop or retainer of some type is provided to limit such rotation, door 15 would be free to rotate further counterclockwise about the axis of second pivot joint 25, beyond the rotational position shown in FIG. 3. In such other open positions, even further lateral clearance between portions of door 15 and the boundary of door opening 53 indicated by the left side of the arrow 55 would be possible. Other open positions could also correspond to further counterclockwise rotation of pivot joint 20 beyond the rotational position thereof illustrated in FIG. 3.

Figure 4:
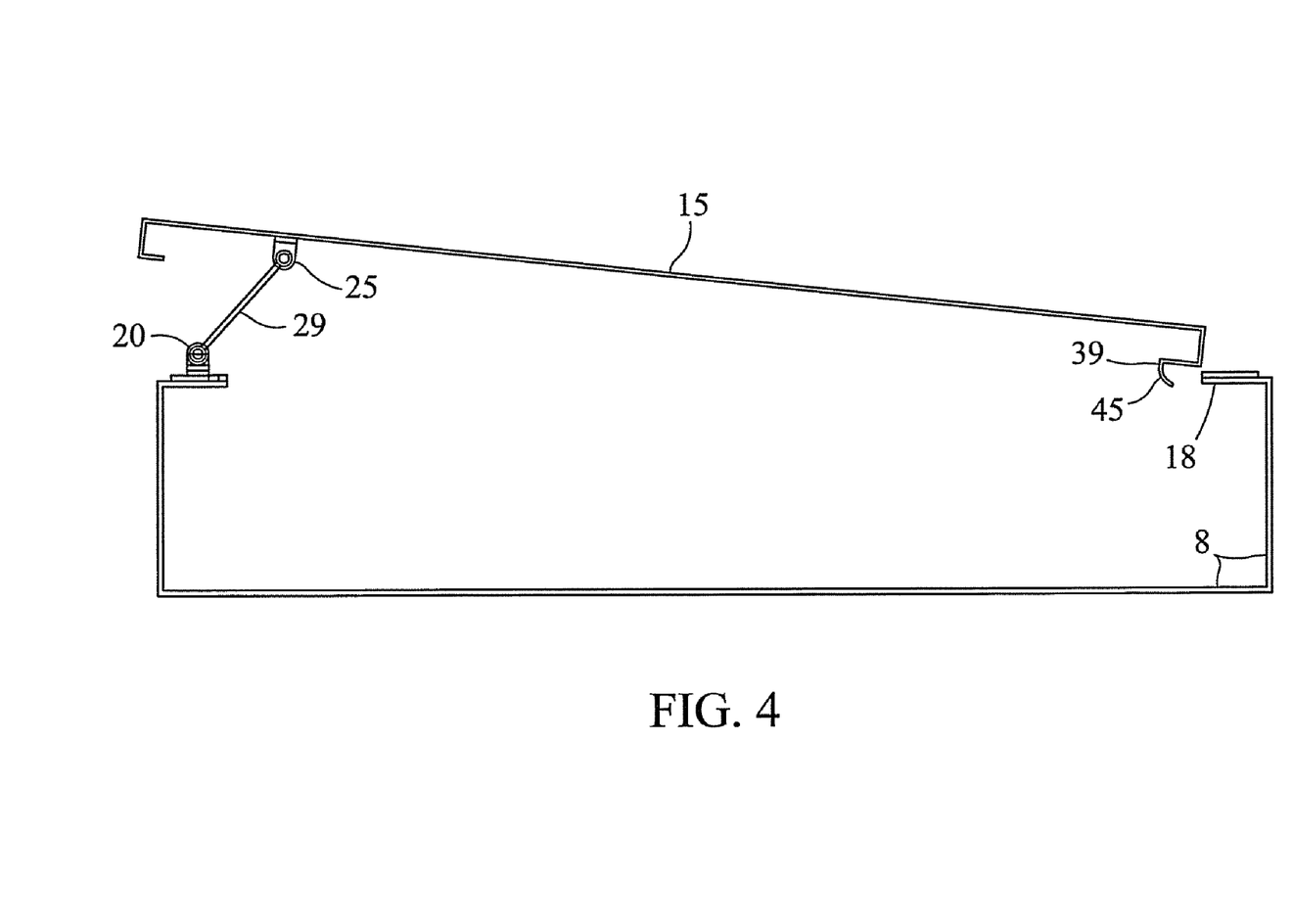
FIG. 4 is a bottom elevational, section view taken a long line A-A of FIG. 1 except showing the door assembly in an intermediate position.

FIG. 4 shows door assembly 5 in an intermediate position in which first pivot joint 20 has been rotated clockwise relative to the rotational position thereof shown in FIG. 3. In FIG. 4, pivot joint 20 has been rotated sufficiently counterclockwise to move door 15 laterally toward the closed position that second pivot joint 25 lies inside the lateral boundaries of cabinet 8. In addition, door 15 has also been rotated counterclockwise about second pivot joint 25 such that the opposite side 14 of door 15 which lies opposite hinge 10 and carries tab 39 is near, but has not yet reached, the portion of door frame 18 which mates with tab 39.

Figure 5:
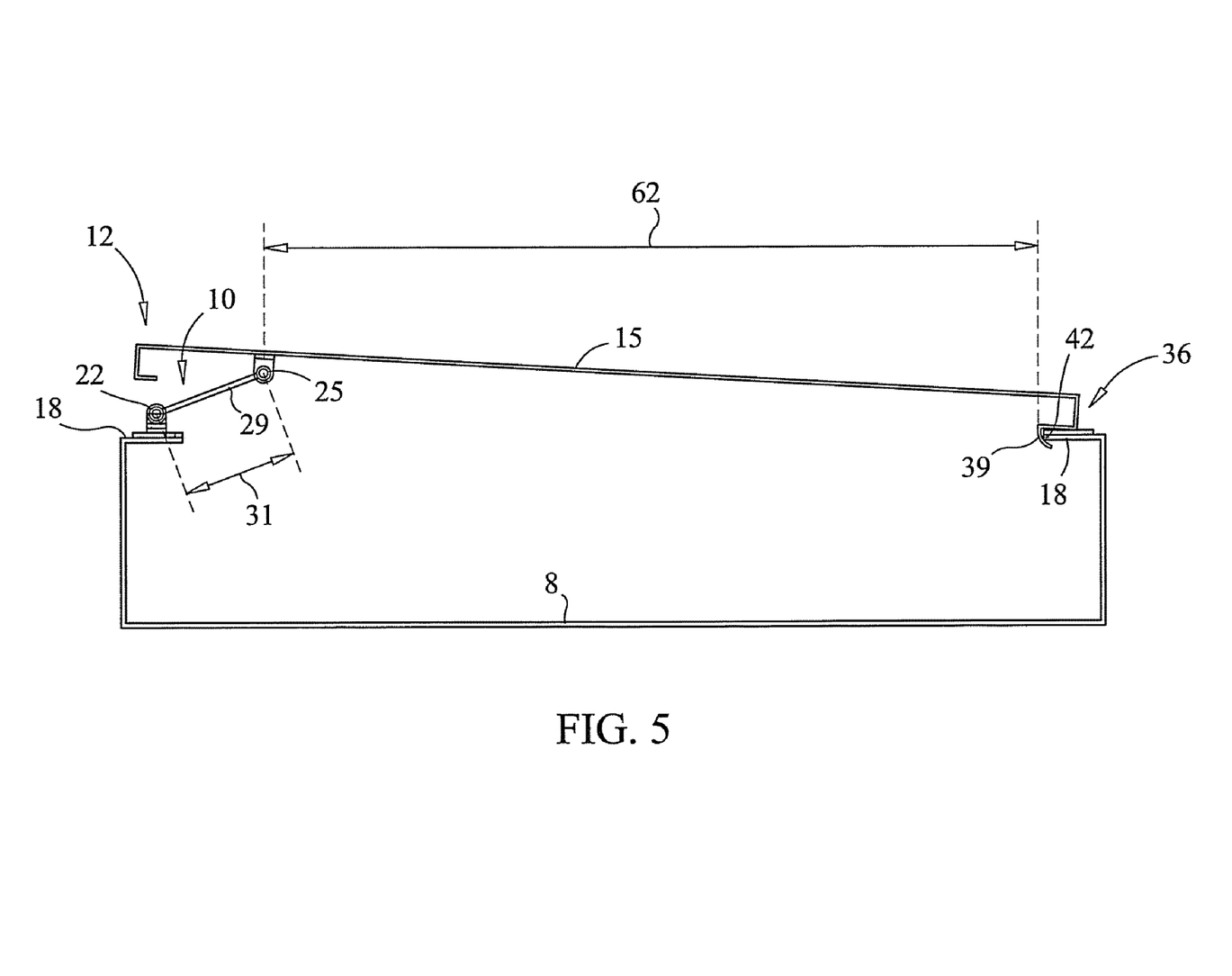
FIG. 5 is a bottom elevational, section view taken a long line A-A of FIG. 1 except showing the door assembly in a partially closed position.

FIG. 5 shows door assembly 5 in a partially closed position which lies closer to the closed position (to be described below with reference to FIG. 6) than does the intermediate position of FIG. 4. In the partially closed position shown in FIG. 5, hinge 10 has been rotated sufficiently to bring tab 39 into partial engagement with door frame 18 to a degree such that they begin to resist further engagement. At this position, door 15 is angled such that an open gap remains between the hinge side 12 of door 15 and the portion of door frame 18 with which it will mate in the closed position. The partially closed position is such that closure of the aforementioned gap requires force to be exerted at the hinge side 12 of door 15. These conditions owe to the fact that between the partially closed position and the closed position, the door assembly 5 is structured as a toggle linkage and operates as such. More particularly, the toggle linkage is comprised of three pivoting joints which cooperate with one another as mechanical links. The first two of those joints are pivot joints 22 and 25. Those joints are spanned by a first mechanical link made up of hinge 10 itself. The first mechanical link has an effective length corresponding approximately to the distance 31 between first pivot axis 22 and second pivot axis 27. The second mechanical link of the toggle linkage is represented by that portion 62 of door 15 which spans the effective distance between second pivot axis 27 and third pivot axis 42. The second pivot joint 25 of the toggle linkage is not yet at a center position when door assembly is in the partially closed position shown in FIG. 5.

FIG. 6 shows door assembly 5 in the closed position which is reached from the partially closed position by applying sufficient external force to door 15 to move its hinge side 12 past the intermediate position toward the portion of door frame 18 against which it closes. The force necessary is substantially greater than the force needed to move door 15 between the open position and the partially closed position, or vice versa. As the door 15 moves between the partially closed position and the closed position, door 15 pivots about third pivot axis 42 owing to the engagement of tab 39 and the mating portion of door frame 18 which together make up latch 36. As door pivots about axis 42 in a counterclockwise direction, the curved portion 45 of tab 39 slips beneath the lower surface of door frame 18 so as to resist tampering by prying door 15 away from door frame 18. Once the second pivot joint 25 of the toggle mechanism described above passes a center position 66, toggle action causes door assembly 5 to lock itself by springing to the closed position, and holds the door assembly 5 in the closed position under continuous force. As will be understood from inspection of FIGS. 5 and 6, the force is generated by a slight elastic bending of hinge body 29 which occurs as the spacing between the centers of pivot joints 20 and 25 decreases slightly as door 15 is forced from the partially closed position shown in FIG. 5 to the closed position of FIG. 6. The amount of force can be adjusted according to the needs of a particular application by varying the geometry of the toggle mechanism. In addition to holding the hinged side 12 of door 15 closed tightly against the face of door frame 18, this force also serves to take up any play in pivot joints 20 and 25 thereby providing a tight, rattle-free closure.

Once door assembly 5 is in the closed position, it can be opened only by lifting the hinge side 12 of door 15 away from door frame 18 with sufficient force to overcome the closing force exerted by the toggle linkage. Such force must be applied until the center position 66 is passed in the reverse direction. Thereafter, the door 15 will spring to the partially closed position from which it can be moved to the open position by reversing the closure operation described above.

As demonstrated by the preferred embodiment just described, the invention can be implemented in a manner effective to deter the opening of door assembly 5 by unauthorized persons. The manner in which latch 36 is configured and mounted to resist such tampering has already been explained. As can be seen from enlarged detail 6B of FIG. 6, physical access to the engaging members of latch 36 is blocked, and latch 36 is concealed from view, from locations exterior of door assembly 5 when it is in the closed position. Preferably, latch 36 is secured such that no fasteners or other means by which components of latch 36 may be attached are visible from the exterior of door assembly 5 when it is in the closed position. As can readily be seen from inspection of the enlarged detail 6A of FIG. 6 the same is true of hinge 10.

The foregoing describes certain preferred and alternative embodiments of the present invention. It is to be understood that the invention is not limited to the particular embodiments described. In light of the present disclosure, various other embodiments will be apparent to persons skilled in the art. Accordingly, it is to be recognized that changes can be made without departing from the scope of the invention as particularly pointed out and distinctly claimed in the appended claims which are to be construed to encompass all legal equivalents thereof.

What is claimed is:

1. A door assembly, comprising:

a door having an inside surface and an outside surface, said door being selectively movable with respect to a door frame between at least an open position, a partially open position, and a closed position [with respect to a door frame], said door having a hinge side and an opposite side, said [hinge side of said] door being mounted to [both] said door frame [and to said door] by way of at least one hinge, said hinge having a first pivot joint and a second pivot joint which are connected to one another by way of a hinge body, said first pivot joint being mechanically coupled to said door frame and said second pivot joint being mechanically coupled to said inside surface of said door, said first pivot joint being rotatable about a first axis, said second pivot joint being rotatable about a second axis, first axis and said second axis being oriented substantially parallel to one another and spaced a distance apart from one another, said opposite side of said door being mechanically coupled to a first mating member of a latch, said latch further including a second mating member mechanically coupled to said door frame, said first and second mating members of said latch being engageable with one another to form a third pivot joint when said door is in either said partially closed position or said closed position, said [latch being adapted to function as a] third pivot joint [which permits rotation] permitting pivoting of said door about a third axis when said door is in either said partially closed position or said closed position, said third axis being oriented substantially parallel to said first axis and said second axis; said [door, said hinge and said latch] first pivot joint, said hinge body, said second pivot joint, said third pivot joint and a portion of said door which extends between said third pivot joint and said second pivot joint being arranged to form a toggle [mechanism] linkage when said first and second mating members of said latch are pivotally engaged with one another [said door is either in or between said closed position and said partially closed position], said toggle [mechanism] linkage having a center position between said first axis and said third axis, said toggle linkage being operable to hold said door [assembly] in said closed position under force

[when said door assembly in said closed position] in response to said second axis passing said center position upon said door being moved from said partially closed position to said closed position; said first axis and said second axis both being located intermediate said hinge side of door and said opposite side of said door when said door is in said closed position.

2. A door assembly as claimed in claim 1 wherein [said second pivot joint is mounted to an inside surface of said door and] said [second] first pivot joint is mounted to a portion of said door frame which is covered by said door when said door is in said closed position such that said first and second pivot joints, as well as said portion of said door frame, are inaccessible from the exterior of the door assembly when said door is in said closed position.

3. A door assembly as claimed in claim 2 wherein a portion of said latch engages an underside of said door frame which is inaccessible when said door is in said closed position.

\* \* \* \* \*